United States Patent
Jaradi et al.

(10) Patent No.: US 11,702,026 B2
(45) Date of Patent: *Jul. 18, 2023

(54) VEHICLE CROSSBAR MOVABLE ALONG PILLARS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/474,529

(22) Filed: Sep. 14, 2021

(65) Prior Publication Data

US 2023/0080246 A1    Mar. 16, 2023

(51) Int. Cl.
| | |
|---|---|
| *B60R 21/213* | (2011.01) |
| *B60R 21/08* | (2006.01) |
| *B60R 21/231* | (2011.01) |
| *B60R 21/02* | (2006.01) |
| *B60R 21/01* | (2006.01) |
| *B60R 21/233* | (2006.01) |

(52) U.S. Cl.
CPC ............ *B60R 21/213* (2013.01); *B60R 21/08* (2013.01); *B60R 21/231* (2013.01); *B60R 2021/01245* (2013.01); *B60R 2021/0246* (2013.01); *B60R 2021/0273* (2013.01); *B60R 2021/23107* (2013.01); *B60R 2021/23153* (2013.01); *B60R 2021/23161* (2013.01); *B60R 2021/23308* (2013.01); *B60R 2021/23324* (2013.01)

(58) Field of Classification Search
CPC . B60R 21/213; B60R 21/08; B60R 21/01512; B60R 21/015; B60R 21/231; B60R 21/233; B60R 2021/0246; B60R 2021/0273; B60R 2021/01211; B60R 2021/23107; B60R 2021/01245; B60R 2021/23161; B60R 2021/23153; B60R 2021/23308; B60R 2021/23324; B60R 2021/01034
USPC .... 280/753, 735, 728.1, 728.2, 730.1, 743.1
See application file for complete search history.

(56) References Cited

U.S. PATENT DOCUMENTS

| | | | |
|---|---|---|---|
| 5,655,817 A * | 8/1997 | Nienow | B60R 22/105 |
| | | | 297/487 |
| 9,994,182 B1 | 6/2018 | Jaradi et al. | |
| 10,336,279 B2 | 7/2019 | Farooq et al. | |
| 10,407,018 B2 | 9/2019 | Sundararajan et al. | |
| 10,906,496 B2 | 2/2021 | Baccouche et al. | |
| 11,273,785 B1 * | 3/2022 | Faruque | B60R 21/01554 |
| 11,358,554 B1 * | 6/2022 | Jaradi | B60R 21/231 |
| 2020/0377041 A1 * | 12/2020 | Sekizuka | B60R 13/0823 |
| 2021/0107426 A1 * | 4/2021 | Choi | B60N 3/002 |

* cited by examiner

*Primary Examiner* — Keith J Frisby
(74) *Attorney, Agent, or Firm* — Frank A. MacKenzie; Bejin Bieneman PLC

(57) ABSTRACT

An assembly for a vehicle includes a first pillar and a second pillar spaced cross-vehicle from the first pillar. The assembly includes a crossbar movably supported by the first pillar and the second pillar. The crossbar is movable along the first pillar and the second pillar from a raised position to a lowered position. The assembly includes an airbag supported by the crossbar.

20 Claims, 11 Drawing Sheets

US 11,702,026 B2

VEHICLE CROSSBAR MOVABLE ALONG PILLARS

BACKGROUND

Vehicles are equipped with airbags. In the event of an impact, an inflator activates and provides inflation medium to the airbags, and the airbags pressurize and act as supplemental restraints for occupants during the impact. The airbags are located at various fixed positions in passenger compartments of vehicles. Vehicles may include airbags supported on a dash, side air curtains mounted to the roof rails, side airbags mounted to seats, etc.

DETAILED DESCRIPTION

Figure 1:
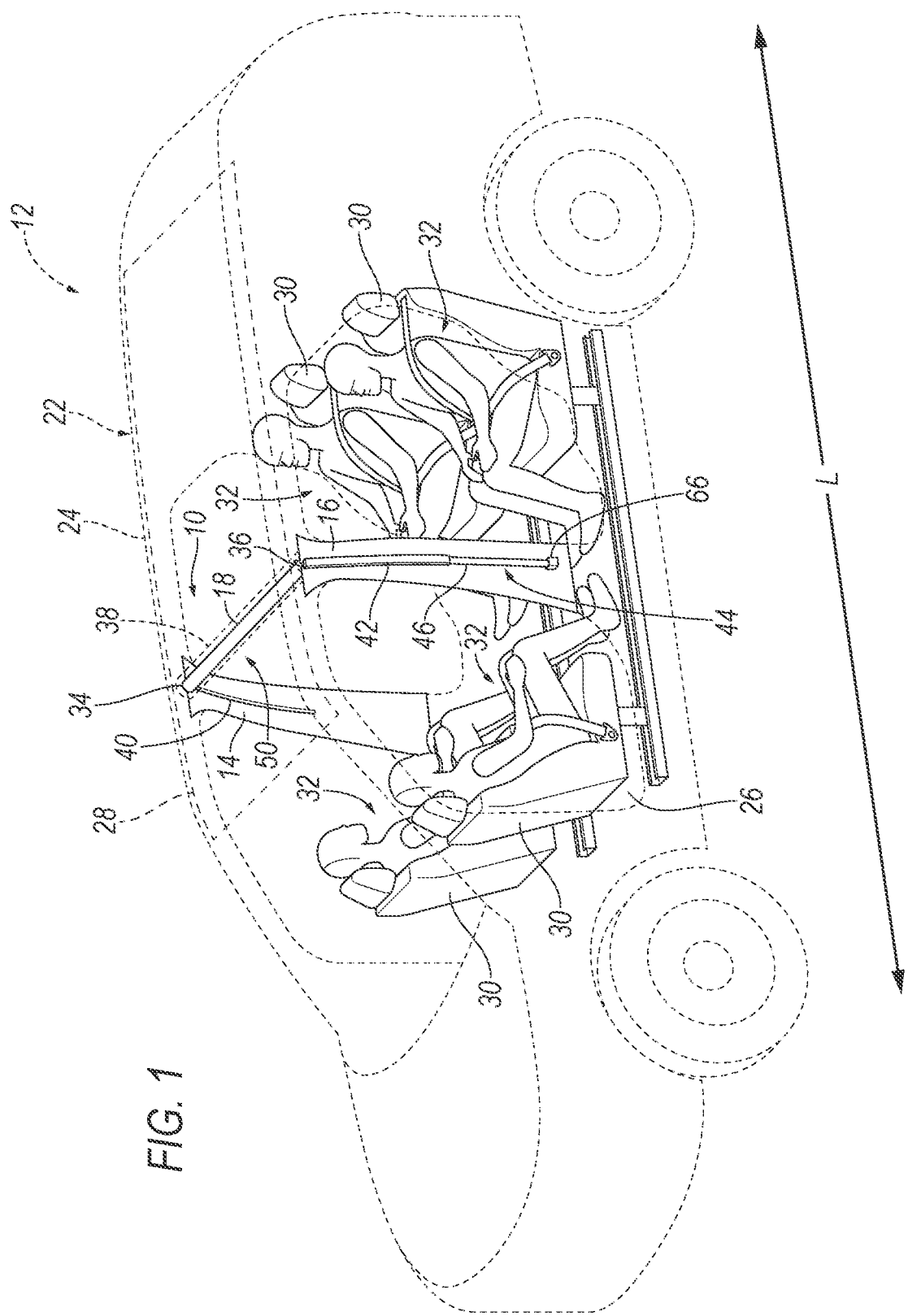
FIG. 1 is a perspective view of a vehicle having a crossbar moveable along pillars of the vehicle from a raised position to a lowered position.
Figure 2:
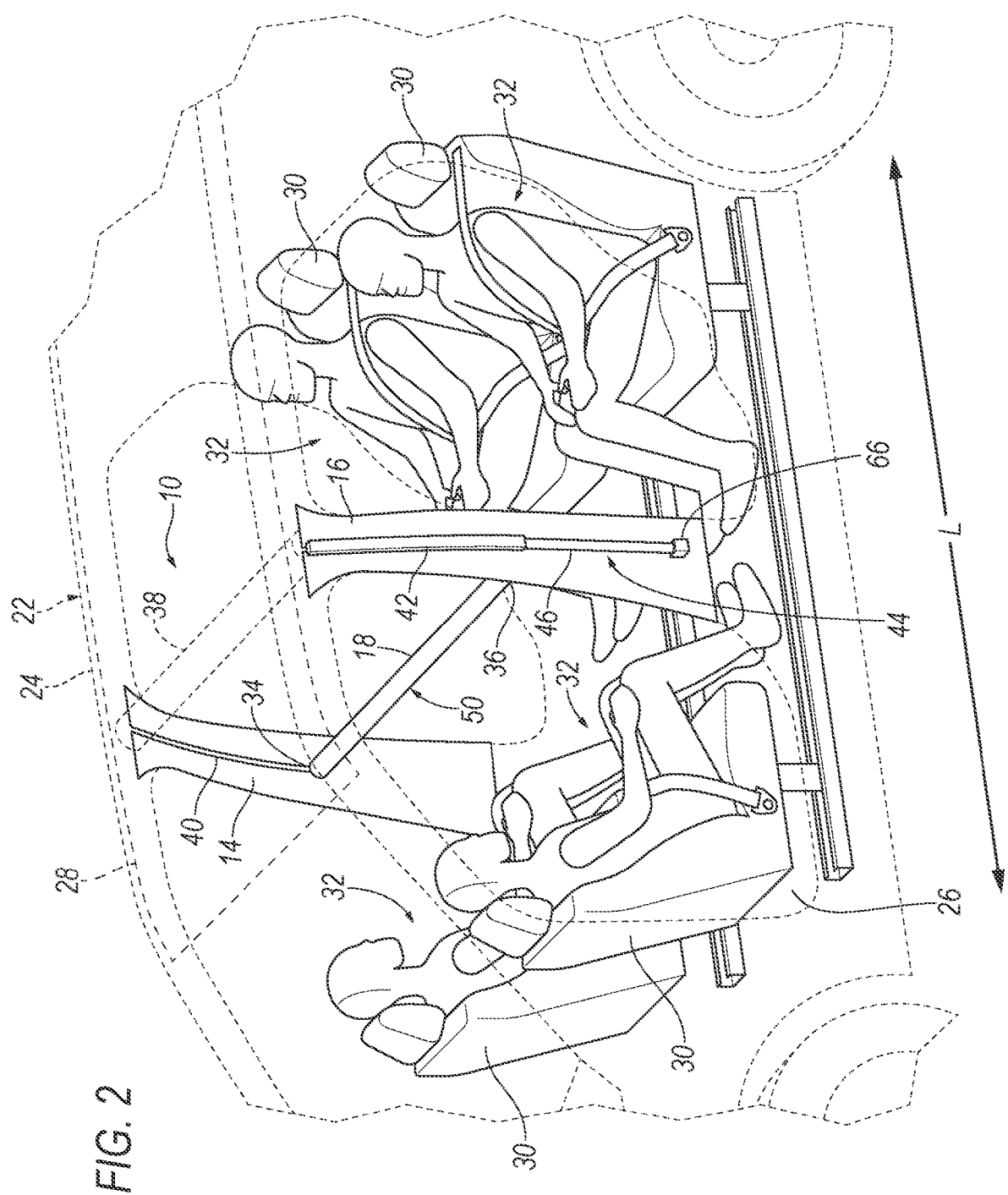
FIG. 2 is a perspective view of the vehicle with the crossbar in the lowered position.
Figure 3:
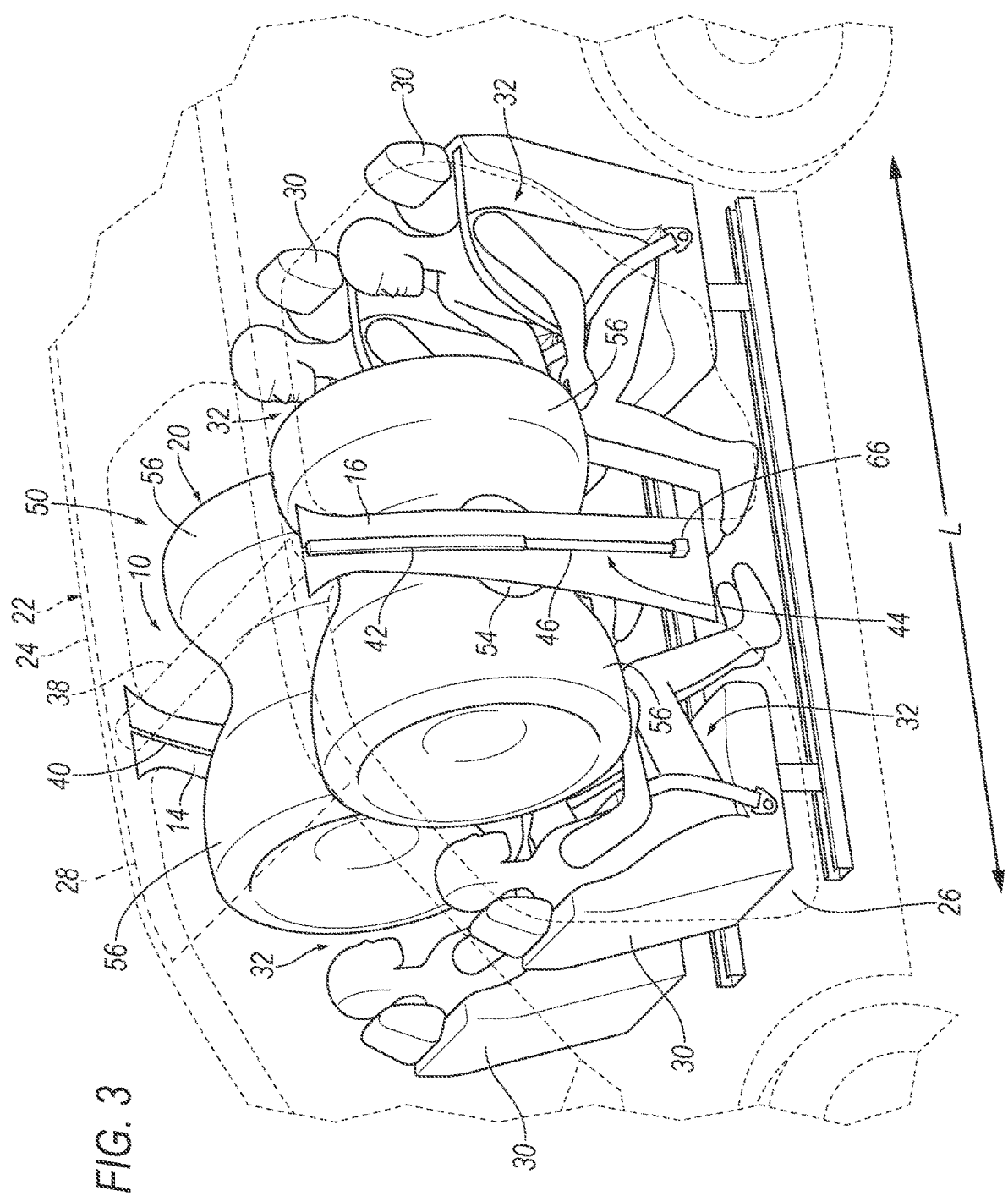
FIG. 3 is a perspective view of the vehicle with the crossbar in the lowered position and one example of an airbag supported by the crossbar in the inflated position.
Figure 4:
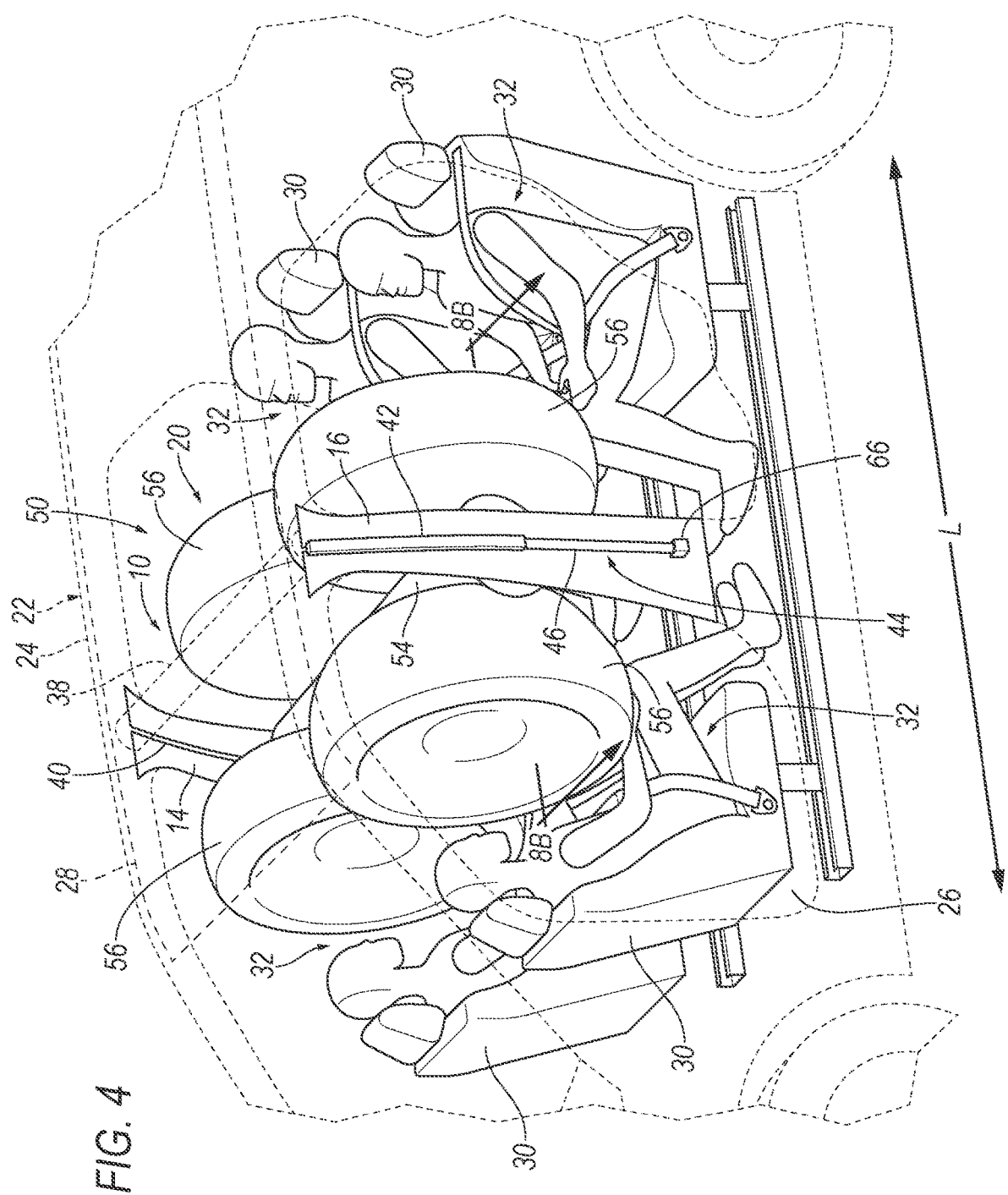
FIG. 4 is a perspective view of the vehicle with the crossbar in the lowered position and another example of the airbag supported by the crossbar in the inflated position.
Figure 5:
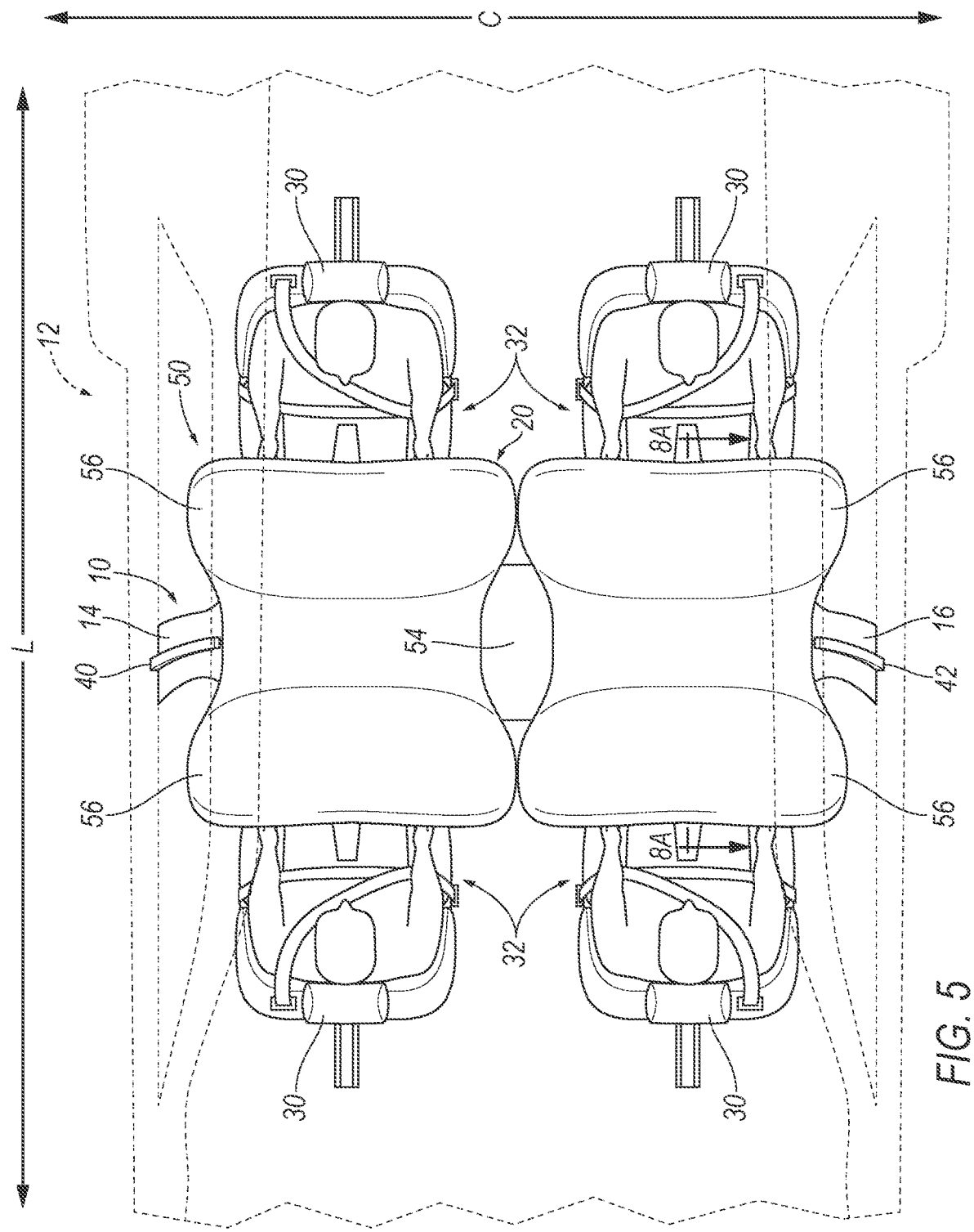
FIG. 5 is a plan view of the vehicle with the crossbar in the lowered position and the example of the airbag of FIG. 4 supported by the crossbar in the inflated position.

An assembly includes a first pillar and a second pillar spaced cross-vehicle from the first pillar. The assembly includes a crossbar movably supported by the first pillar and the second pillar. The crossbar is movable along the first pillar and the second pillar from a raised position to a lowered position. The assembly includes an airbag supported by the crossbar.

The assembly may include a first track supported by the first pillar and a second track supported by the second pillar, the crossbar being moveably supported by the first track and the second track.

The assembly may include a linear actuator supported by one of the first pillar and the second pillar, the crossbar being moveable by the linear actuator along the first track and the second track from the raised position to the lowered position.

The crossbar may be spring-loaded between the first pillar and the second pillar.

The crossbar may be elongated from the first pillar to the second pillar.

The assembly may include a vehicle roof supported by the first pillar and the second pillar, the crossbar being spaced from the vehicle roof in the lowered position.

The vehicle roof may define a slot elongated from the first pillar to the second pillar, the crossbar being in the slot in the raised position.

The assembly may include a pair of seats spaced along a vehicle-longitudinal axis, the crossbar being between the pair of seats.

The airbag may include a cross-vehicle chamber elongated along the crossbar and an extension supported by the cross-vehicle chamber, the extension extending transverse to the cross-vehicle chamber and toward an occupant seating area of one of the seats in an inflated position.

The airbag may include a cross-vehicle chamber elongated along the crossbar and an extension supported by the cross-vehicle chamber extending transverse to the cross-vehicle chamber in an inflated position.

The cross-vehicle chamber and the extension may be fluidly connected.

The cross-vehicle chamber may surround the crossbar in the inflated position.

The assembly may include a second extension supported by the cross-vehicle chamber extending transverse to the cross-vehicle chamber in the inflated position.

The second extension may extend from the cross-vehicle chamber in a direction opposite the extension.

The second extension may extend from the cross-vehicle chamber in a common direction of the extension.

The assembly may include a linear actuator supported by one of the first pillar and the second pillar, the crossbar being moveable by the linear actuator from the raised position to the lowered position.

The assembly may include an inflator supported on the crossbar and in fluid communication with the airbag.

The airbag may be inflatable to an inflated position surrounding the crossbar when the crossbar is in the lowered position.

A computer including a processor and a memory storing instructions executable by the processor to identify an occupant is seated in a seat of a vehicle, move a crossbar from a raised position to a lowered position based on identification of the occupant being seated in the seat, identify an indication that an occupant is exiting the vehicle, and move the crossbar from the lowered position to the raised position based on the indication that the occupant is exiting the vehicle.

The instructions may further include to identify an obstruction between the raised position and the lowered position and stop movement of the crossbar toward the lowered position based on identification of the crossbar contacting an obstruction in the vehicle.

With reference to the Figures, wherein like numerals indicate like parts throughout the several views, an assembly 10 for a vehicle 12 includes a first pillar 14 and a second pillar 16 spaced cross-vehicle from the first pillar 14. The assembly 10 includes a crossbar 18 movably supported by the first pillar 14 and the second pillar 16. The crossbar 18 is movable along the first pillar 14 and the second pillar 16 from a raised position to a lowered position. The assembly 10 includes an airbag 20 supported by the crossbar 18.

The crossbar 18 is able to move along the first pillar 14 and the second pillar 16 from the raised position to the lowered position. The crossbar 18 may move to the lowered position when occupants are seated in the vehicle 12 and may move to the raised position when occupants intend to exit the vehicle 12. The airbag 20 is supported by the crossbar 18. When the crossbar 18 is in the lowered position, the airbag 20 may control the kinematics of occupants of the vehicle 12 in the event of an impact to the vehicle 12.

With reference to FIGS. 1-5, the vehicle 12 may be any suitable type of automobile, e.g., a passenger or commercial automobile such as a sedan, a coupe, a truck, a sport utility, a crossover, a van, a minivan, a taxi, a bus, etc. The vehicle 12, for example, may be autonomous. In other words, the vehicle 12 may be autonomously operated such that the vehicle 12 may be driven without constant attention from a driver, i.e., the vehicle 12 may be self-driving without human input.

The vehicle 12 includes a vehicle body 22. The vehicle body 22 includes body panels (not numbered) partially defining an exterior of the vehicle 12. The body panels may present a class-A surface, e.g., a finished surface exposed to view by a customer and free of unaesthetic blemishes and defects. The body panels include, e.g., a roof panel, etc.

The vehicle 12 includes a passenger compartment (not numbered) to house occupants, if any, of the vehicle 12. The passenger compartment may extend across the vehicle 12, i.e., from one side to the other side of the vehicle 12. The passenger compartment includes a front end and a rear end with the front end being in front of the rear end during forward movement of the vehicle 12.

The vehicle body 22 may include a vehicle roof 24 spaced upwardly from a vehicle floor 26. The vehicle body 22 includes pillars 14, 16 extending from the vehicle floor 26 to the vehicle roof 24. The vehicle roof 24 is supported by the pillars 14, 16. For example, the vehicle body 22 may include an A-pillar and a B-pillar on each side of the vehicle 12. The A-pillars may extend between a windshield and front doors. In other words, the A-pillars may be disposed at the front end of the passenger compartment. The B-pillars may extend behind the front doors, e.g., between adjacent doors. In other words, the B-pillars may be spaced from the A-pillars by a front door opening. The vehicle 12 may include additional pillars 14, 16, e.g., C-pillars, D-pillars. The pillars 14, 16 may extend from the roof to the floor. In the example shown in the Figures, the first pillar 14 and the second pillar 16 are the B-pillars of the vehicle 12. The first pillar 14 and the second pillar 16 are spaced cross-vehicle from each other.

The vehicle 12 may include a headliner 28 supported by the vehicle body 22, specifically, the vehicle roof 24. The headliner 28 may conceal the roof panel, i.e., the vehicle roof 24, from view inside the vehicle 12, i.e., in the passenger compartment of the vehicle 12. The headliner 28 includes a class-A surface facing the passenger compartment, i.e., a surface specifically manufactured to have a high quality, finished, aesthetic appearance free of blemishes. The headliner 28 may be, for example, a polymeric panel that spans the vehicle roof 24. As an example, the headliner 28 may include polyurethane foam. The headliner 28 may be designed to absorb energy, e.g., by compression and deformation, in the event the headliner 28 is impacted by an occupant.

With continued reference to FIGS. 1-5, the vehicle 12 may include one or more seats 30. The seats 30 are supported by the vehicle floor 26. The seats 30 may be arranged in any suitable arrangement in the passenger compartment. As in the example shown in the Figures, one or more of the seats 30 may be at the front end of the passenger compartment. In other examples, one or more of the seats 30 may be behind the front end of the passenger compartment, e.g., at the rear end of the passenger compartment. The seats 30 may be movable relative to the vehicle floor 26 to various positions, e.g., movable fore-and-aft and/or cross-vehicle. The seat 30 may be of any suitable type, e.g., a bucket seat.

The vehicle 12 may include any suitable number of seats 30. In the example shown in the Figures, the vehicle 12 includes four seats 30. The seats 30 may be positioned in a rectangular configuration. In such an example, the vehicle 12 may include two rows of seats 30 spaced along a vehicle-longitudinal axis L. One of the rows may be at the front end of the passenger compartment and the other of the rows may be at the rear end of the vehicle 12. The seats 30 in one of the rows face toward the seats 30 in the other of the rows. In other words, one of the rows faces toward the rear end of the passenger compartment and the other of the rows faces toward the front end of the passenger compartment. Each of the rows may include two seats 30 spaced cross-vehicle from each other. In other words, one seat 30 from one row is spaced along the vehicle-longitudinal axis L from the one seat 30 from the other row.

The seats 30 each include a seatback (not numbered), a seat bottom (not numbered), and a head restraint (not numbered). The head restraint may be supported by and extending upwardly from the seatback. The head restraint may be stationary or movable relative to the seatback. The seatback may be supported by the seat bottom and may be stationary or movable relative to the seat bottom. The seatback, the seat bottom, and the head restraint may be adjustable in multiple degrees of freedom. Specifically, the seatback, the seat bottom, and the head restraint may themselves be adjustable. In other words, adjustable components within the seatback, the seat bottom, and the head restraint may be adjustable relative to each other.

The seatback and the seat bottom define an occupant seating area 32 of the seat 30. The occupant seating area 32 is the area occupied by an occupant when properly seated on the seat bottom and the seatback. The occupant seating area 32 is in a seat-forward direction of the seatback and above the seat bottom.

With reference to FIGS. 1-7, the assembly 10 includes the crossbar 18. The crossbar 18 may move from the raised position and the lowered position depending on occupancy of the vehicle 12. When occupants are seated in one or more of the seats 30 in the vehicle 12, the crossbar 18 moves to the lowered position. When occupants intend to exit the vehicle 12, the crossbar 18 moves to the raised position to allow space in the passenger compartment for the occupants to exit the vehicle 12.

The crossbar 18 is elongated from the first pillar 14 to the second pillar 16. In other words, the crossbar 18 extends across the vehicle 12 in a cross-vehicle direction C. The crossbar 18 is movably supported by the first pillar 14 and the second pillar 16. Specifically, the crossbar 18 is movable along the first pillar 14 and the second pillar 16 from the raised position to the lowered position. The crossbar 18 may extend from a first end 34 movably supported by the first pillar 14 and a second end 36 movably supported by the second pillar 16. In the lowered position, the crossbar 18 may be spaced downwardly from the vehicle roof 24 and spaced upwardly from the vehicle floor 26. The crossbar 18 may be in the lowered position when occupants are seated in the seats 30. In the raised position, the vehicle roof 24 may receive the crossbar 18 in the raised position. Specifically, as shown in the example in the Figures, the vehicle roof 24 and headliner 28 may define a slot 38 elongated from the first pillar 14 to the second pillar 16. In such an example, the crossbar 18 may move into the slot 38 and is in the slot 38 when in the raised position. In other words, the slot 38 allows the crossbar 18 to be recessed into the vehicle roof 24 and headliner 28 when the crossbar 18 is in the raised position. The crossbar 18 may be in the raised position when occupants of the seats 30 are exiting the vehicle 12.

The crossbar 18 may be elongated between a pair of the seats 30. In the example shown in the Figures, the crossbar 18 may be between the row of seats 30 at the front of the passenger compartment and the row of seats 30 at the rear end of the passenger compartment. Specifically, the crossbar 18 may be between the occupant seating areas 32 of the two rows of seats 30 when the crossbar 18 is in the lowered position.

The assembly 10 may include a first track 40 supported by the first pillar 14 and a second track 42 supported by the second pillar 16. The crossbar 18 is moveably supported by the first track 40 and the second track 42. Specifically, the first end 34 of the crossbar 18 is moveably supported by the first track 40 and the second end 36 of the crossbar 18 is moveably supported by the second track 42. As the crossbar 18 moves between the raised position and the lowered position, the ends 34, 36 of the crossbar 18 move along the first track 40 and the second track 42.

Figure 7:
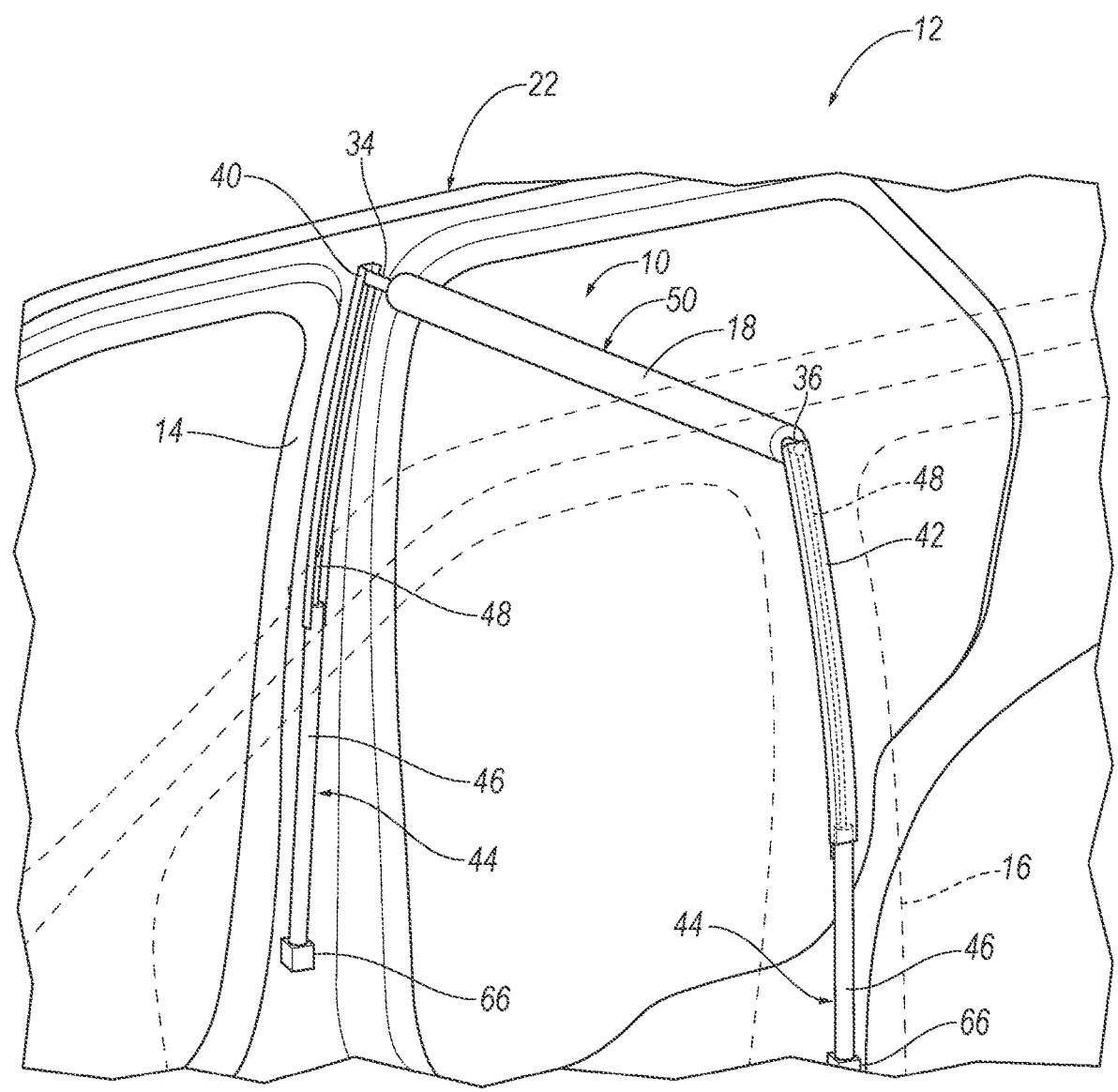
FIG. 7 is a perspective view of the vehicle with the crossbar in the raised position with a pair of tracks supported by the pillars and a linear actuator to move the crossbar from the raised position to the lowered position.
Figure 8A:
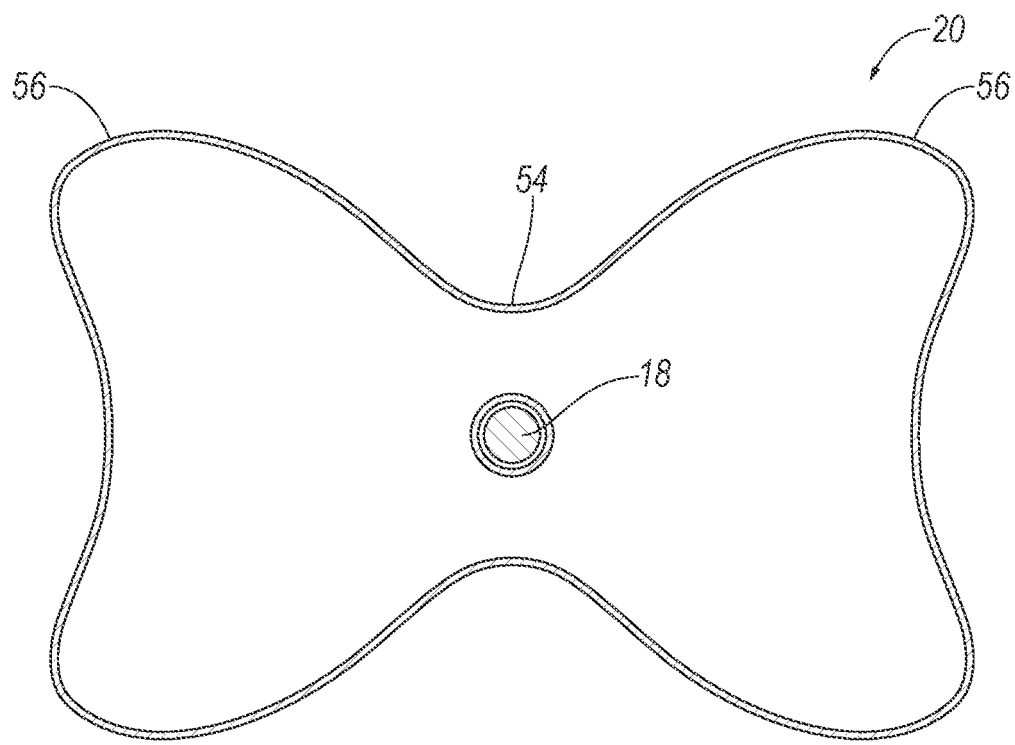
FIG. 8A is a cross-sectional view through line 8A of FIG. 5.
Figure 8B:
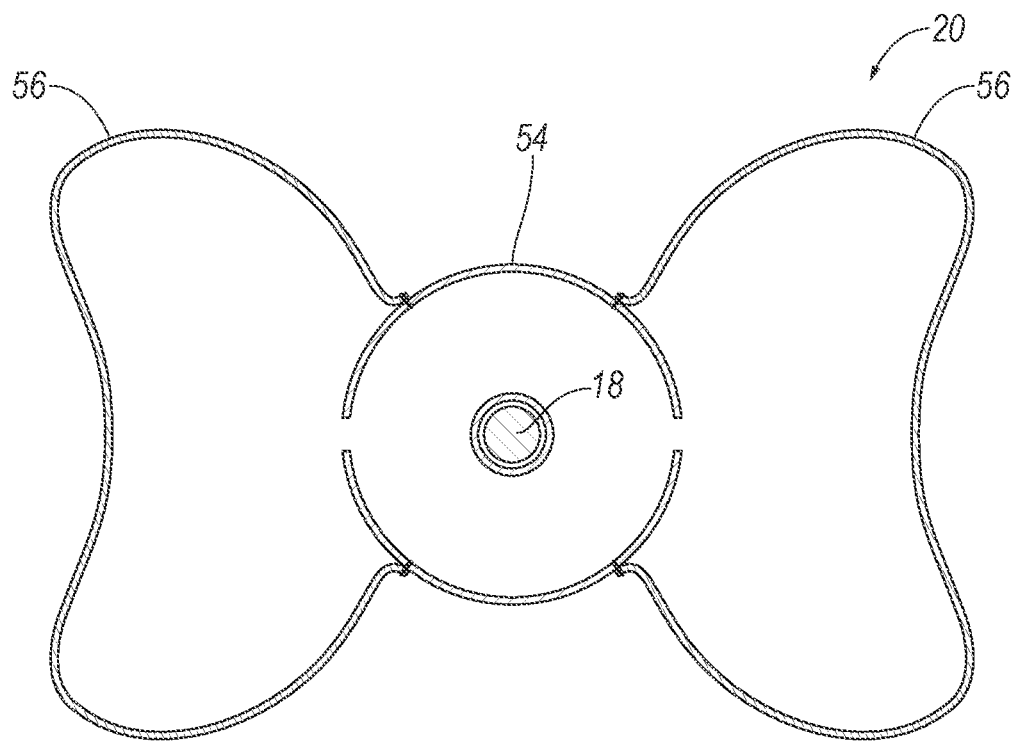
FIG. 8B is a cross-sectional view through line 8B of FIG. 4.

With reference to FIG. 7, the assembly 10 includes a linear actuator 44 supported by one of the first pillar 14 and the second pillar 16. The crossbar 18 is moveable by the linear actuator 44 from the raised position to the lowered position. Specifically, the crossbar 18 is moveable by the linear actuator 44 along the first track 40 and the second track 42 from the raised position to the lowered position. The linear actuator 44 may be coupled to one of the ends 34, 36 of the crossbar 18. The linear actuator 44 moves the ends 34, 36 of the crossbar 18 between the lowered position and the raised position. The assembly 10 may include any suitable number of linear actuators 44 to move the crossbar 18 between the lowered position and the raised position. For example, as shown in the Figures, the assembly 10 may include a linear actuator 44 supported by the first pillar 14 and a linear actuator 44 supported by the second pillar 16.

The linear actuator 44 may include a housing 46 and a screw rod 48 movable into and out of the housing 46. The screw rod 48 may extend from the housing 46 to one of the ends 34, 36 of the crossbar 18. The screw rod 48 may be fully extended from the housing 46 when the crossbar 18 is in the raised position and the screw rod 48 may be retracted into the housing 46 when the crossbar 18 is in the lowered position. The linear actuator 44 includes a motor 66. The motor 66 may be coupled to the screw rod 48 of the linear actuator 44 to move the screw rod 48 to move the crossbar 18 between the raised position and the lowered position.

The crossbar 18 is spring-loaded between the first pillar 14 and the second pillar 16. Specifically, the ends 34, 36 of the crossbar 18 are spring-loaded. As the crossbar 18 moves between the raised position and the lowered position, the crossbar 18 being spring-loaded allows the crossbar 18 to follow the contours of the pillars 14, 16. In other words, the length of the crossbar 18 may vary at the ends 34, 36 based on the contours as the crossbar 18 moves along the pillars 14, 16 between the raised position and the lowered position.

With reference to FIGS. 3-8B, the assembly 10 includes an airbag assembly 50 supported by the crossbar 18. The airbag assembly 50 includes the airbag 20, an inflator 52, and may include a housing (not shown), each of which is supported by the crossbar 18.

The inflator 52 is supported on the crossbar 18. The inflator 52 is fluidly connected to the airbag 20 and in fluid communication with the airbag 20. The inflator 52 expands the airbag 20 with inflation medium, such as a gas, to move the airbag 20 from an uninflated position to an inflated position. The inflator 52 may be, for example, a pyrotechnic inflator that ignites a chemical reaction to generate the inflation medium, a stored gas inflator that releases (e.g., by a pyrotechnic valve) stored gas as the inflation medium, or a hybrid. The airbag assembly 50 may include any suitable number of inflators 52. In the examples shown in the Figures, the airbag assembly 50 includes two inflators 52 to inflate the airbag 20 to the inflated position. In other examples, the size of the inflator 52 may be adjusted to inflate the airbag 20 to the inflated position, e.g., the airbag assembly 50 may include one inflator 52 that is large enough to move the airbag 20 to the inflated position.

As discussed above, the airbag 20 is supported by the crossbar 18. When the crossbar 18 is in the raised position, the airbag 20 is in the uninflated position. Specifically, the airbag 20 may be folded to surround the crossbar 18 when the crossbar 18 is in the raised position and the airbag 20 is in the uninflated position. When the crossbar 18 is in the lowered position, the airbag 20 is in the uninflated position during normal operation of the vehicle 12. In the event of an impact to the vehicle 12 and when the crossbar 18 is in the lowered position, the airbag 20 may inflate to the inflated position. When in the inflated position, the airbag 20 surrounds the crossbar 18. The airbag 20 inflates to the inflated position between the crossbar 18 and the seats 30 of the vehicle 12. In other words, the airbag 20 inflates to the inflated position between the crossbar 18 and the occupant seating areas 32 of the seats 30 of the vehicle 12. In the event of an impact to the vehicle 12, the airbag 20 may inflate to the inflated position to control kinematics of occupants seated in the seats 30 of the vehicle 12.

Figure 6A:
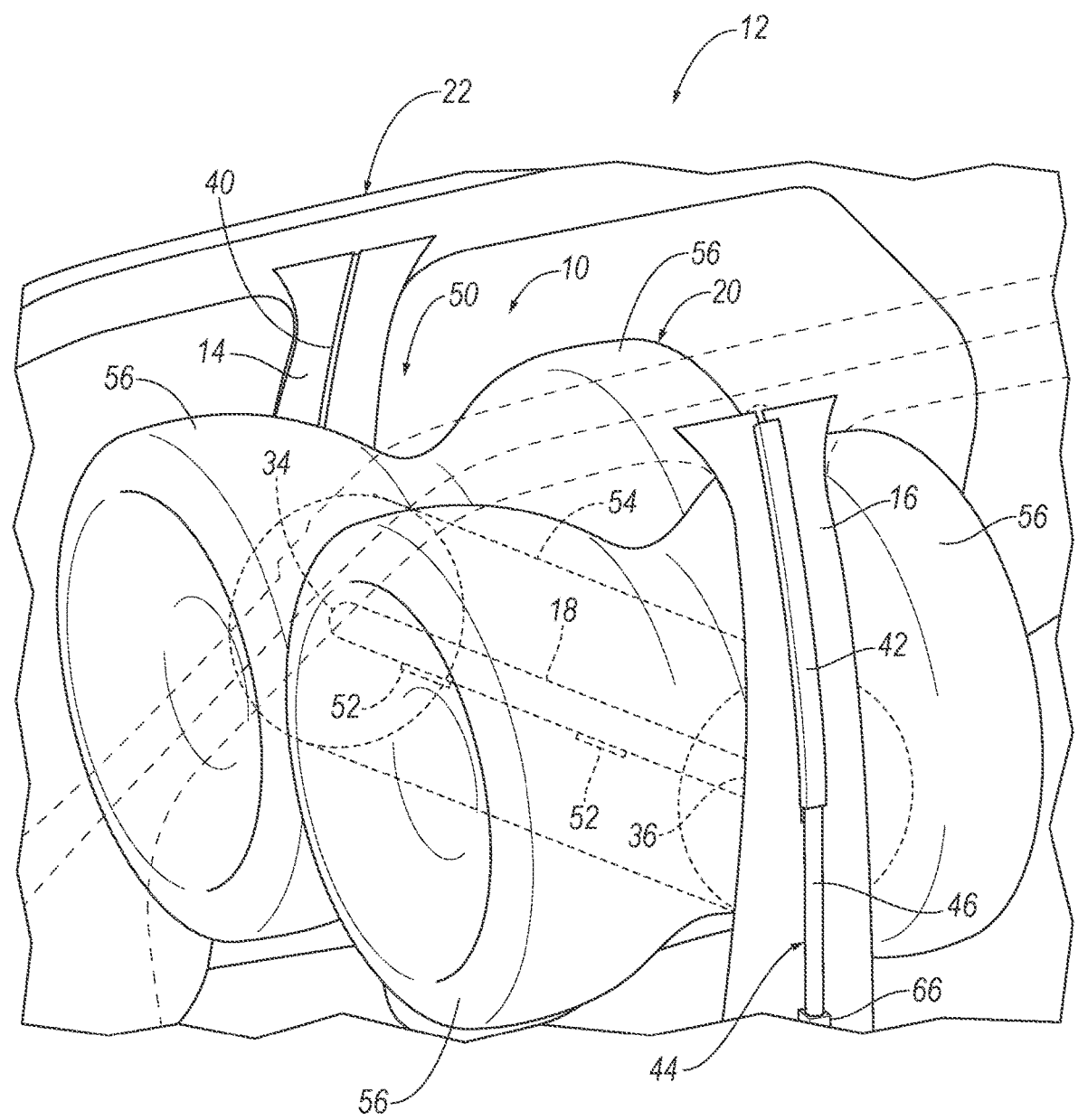
FIG. 6A is perspective view of the vehicle with the crossbar in the lowered position and the example of the airbag of FIG. 3 in the inflated position.
Figure 6B:
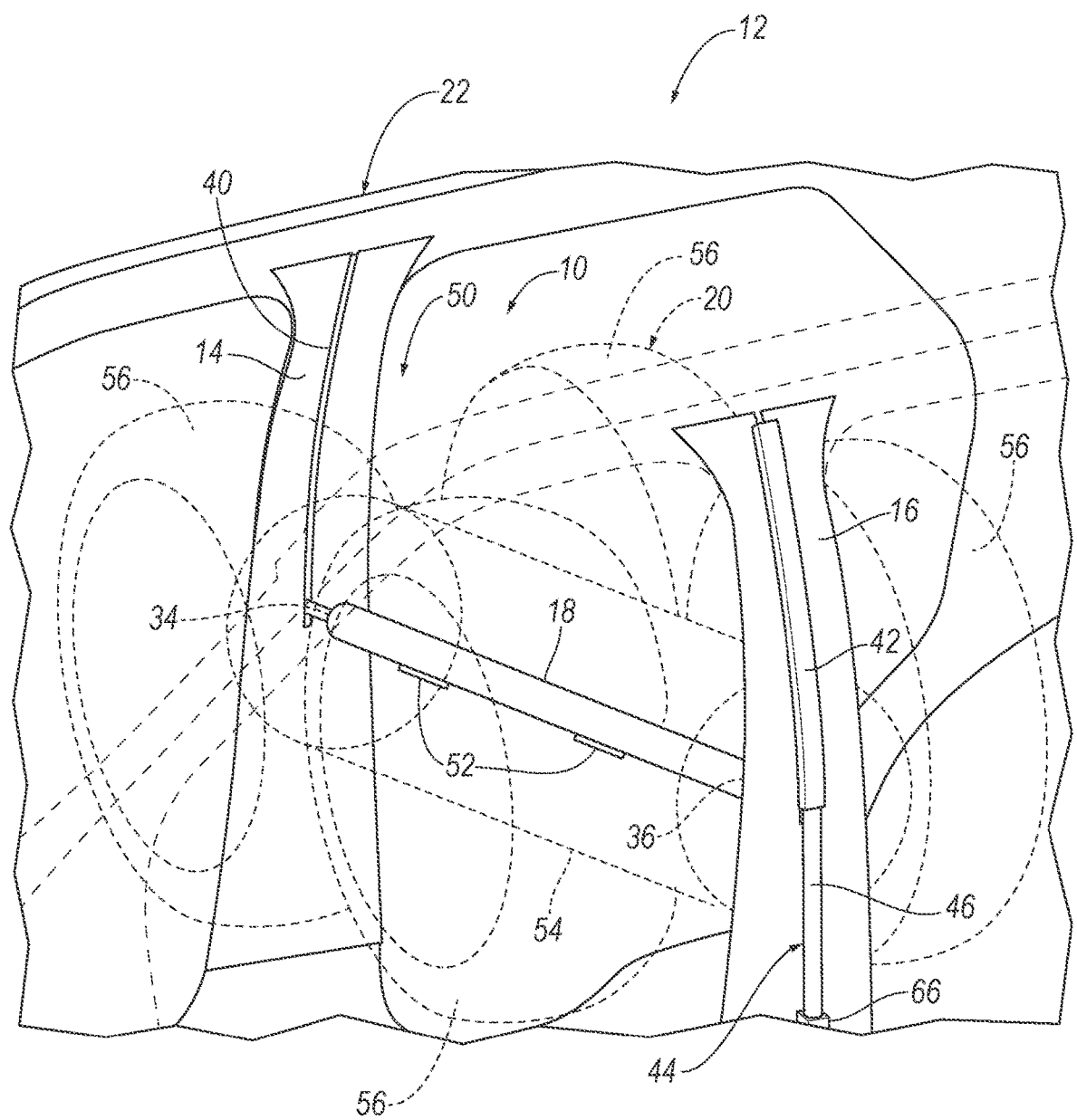
FIG. 6B is a perspective view of the vehicle with the crossbar in the lowered position and another example of the airbag of FIG. 4 in the inflated position.

With reference to FIGS. 6A and 6B, the airbag 20 includes a plurality of chambers 54, 56. Specifically, the airbag 20 includes a cross-vehicle chamber 54 elongated along the crossbar 18 and an extension 56 supported by the cross-vehicle chamber 54. The cross-vehicle chamber 54 surrounds the crossbar 18 when in the inflated position. The crossbar 18 is elongated through a center of the cross-vehicle chamber 54. In other words, the cross-vehicle chamber 54 completely surrounds the crossbar 18 when the airbag 20 is in the inflated position.

The extension 56 extends outwardly from the cross-vehicle chamber 54. The extension 56 extends along the vehicle-longitudinal axis L. In other words, the extension 56 extends transverse to the cross-vehicle chamber 54 in the inflated position outwardly from the cross-vehicle chamber 54. The extension 56 extends toward the occupant seating area 32 of one of the seats 30 in the inflated position. The cross-vehicle chamber 54 and the extensions 56 are fluidly connected. In other words, inflation medium may freely pass from the inflator 52, through the cross-vehicle chamber 54, and into the extensions 56.

With reference to FIGS. 3-5, 6B, 8A, and 8B, the airbag 20 may include any suitable number of extensions 56 supported by the cross-vehicle chamber 54 and extending transverse to the cross-vehicle chamber 54 in the inflated position. The airbag 20 includes an extension 56 facing each of the seats 30 that faces the crossbar 18, i.e., one extension 56 faces each seat 30 of the vehicle 12. In other words, the airbag 20 may include a number of extensions 56 that is equal to the number of seats 30 facing toward the crossbar 18. For example, as shown in the Figures, the airbag 20 includes four extensions 56 with each of the extensions 56 corresponding to each of the four seats 30 facing the crossbar 18. In such an example, some extensions 56 extend from the cross-vehicle chamber 54 in a direction opposite other extensions 56 and some extensions 56 extend from the cross-vehicle chamber 54 in a common direction of other extensions 56. Two extensions 56 extend toward each row of seats 30. The two extensions 56 extending toward the row of seats 30 at the rear end of the passenger compartment extend in a common direction toward the rear end of the passenger compartment and the two extensions 56 extending toward the row of seats 30 at the front end of the passenger compartment extend in a common direction toward the front end of the passenger compartment. The extensions 56 extending toward the front end extend in an opposite direction of the extensions 56 extending toward the rear end.

In the example shown in FIGS. 3, 5, 6B, and 8A, two of the extensions 56 may be fluidly connected to each other and the other two of the extensions 56 may be fluidly connected to each other. Specifically, one of the extensions 56 facing the rear end may be fluidly connected with one of the extensions 56 facing the front end. In the example shown in FIGS. 4 and 8B, each of the extensions 56 is fluidly isolated from each other with the cross-vehicle chamber 54 being between the extensions 56. In other words, each of the extensions 56 is only fluidly connected to the cross-vehicle chamber 54. The vehicle 12 may include any suitable number of combinations of the examples presented in the Figures.

The crossbar 18 is rigid relative to the airbag 20. The crossbar 18 may be of any suitable material that is rigid relative to the airbag 20, e.g., a metal or a plastic. The rigidity of the crossbar 18 relative to the airbag 20 allows the crossbar 18 to act as a reaction surface for the airbag 20 in the inflated position. The crossbar 18 supports the airbag 20, e.g., the extensions 56, and limits the movement of the extensions 56 of the airbag 20 when an occupant impacts the extensions in the event of an impact to the vehicle 12.

The airbag 20, i.e., the cross-vehicle chamber 54 and the extensions 56, may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 9:
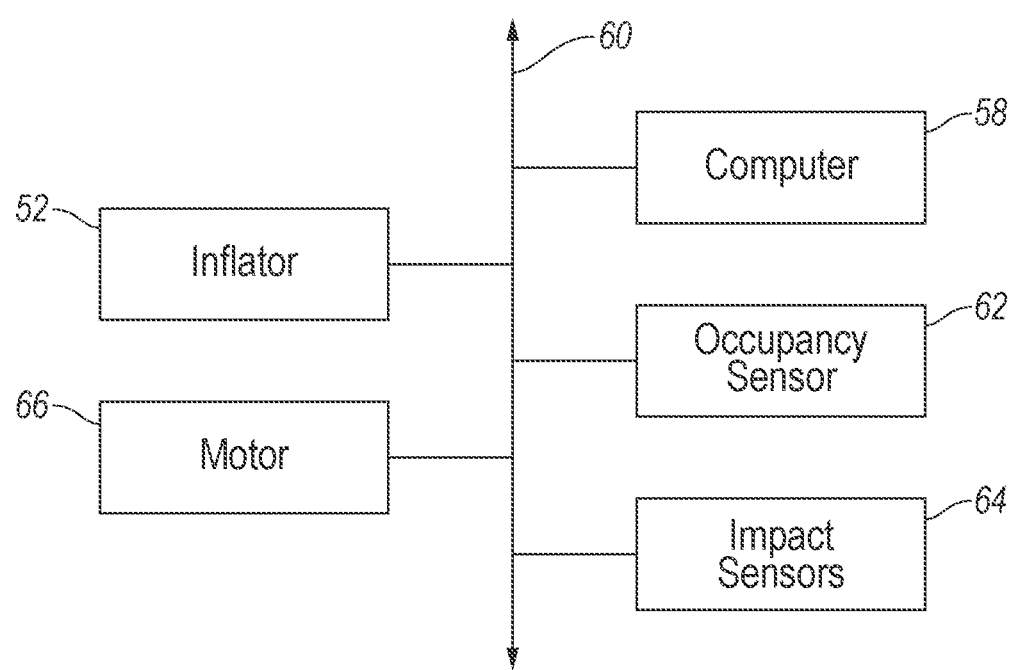
FIG. 9 is a block diagram of a vehicle communication network of the vehicle.

The vehicle computer 58 includes a processor and a memory. The memory includes one or more forms of computer readable media, and stores instructions executable by the vehicle computer 58 for performing various operations, including as disclosed herein. For example, the computer 58 can be a generic computer with a processor and memory as described above and/or may include an electronic control unit ECU or controller for a specific function or set of functions, and/or a dedicated electronic circuit including an ASIC that is manufactured for a particular operation, e.g., an ASIC for processing sensor data and/or communicating the sensor data. In another example, the computer 58 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in a computer 58. The memory can be of any type, e.g., hard disk drives, solid state drives, servers, or any volatile or non-volatile media. The memory can store the collected data sent from the sensors. The memory can be a separate device from the computer 58, and the computer 58 can retrieve information stored by the memory via a network in the vehicle 12, e.g., over a CAN bus, a wireless network, etc. Alternatively or additionally, the memory can be part of the computer 58, e.g., as a memory of the computer 58. The computer 58 may include programming to operate one or more of vehicle brakes, propulsion e.g., control of acceleration in the vehicle 12 by controlling one or more of an internal combustion engine, electric motor, hybrid engine, etc., steering, climate control, interior and/or exterior lights, etc., as well as to determine whether and when the computer 58, as opposed to a human operator, is to control such operations. Additionally, the computer 58 may be programmed to determine whether and when a human operator is to control such operations. The computer 58 may include or be communicatively coupled to, e.g., via a vehicle network such as a communications bus as described further below, more than one processor, e.g., included in components such as sensors, electronic control units (ECUs) or the like included in the vehicle 12 for monitoring and/or controlling various vehicle components, e.g., a powertrain controller, a brake controller, a steering controller, etc. As shown in FIG. 9, the computer 58 is generally arranged for communications on a vehicle communication network 60 that can include a bus in the vehicle 12 such as a controller area network CAN or the like, and/or other wired and/or wireless mechanisms. Alternatively or additionally, in cases where the computer 58 actually comprises a plurality of devices, the vehicle communication network 60 may be used for communications between devices represented as the computer 58 in this disclosure. Further, as mentioned below, various controllers and/or sensors may provide data to the computer 58 via the vehicle communication network 60.

The vehicle 12 may include occupancy sensors 62 to identify whether an occupant is seated in the seats 30. The vehicle computer 58 may be in communication with the occupancy sensors 62. The occupancy sensors 62 may be coupled to the seats 30 to identify when an occupant is seated in the seats 30. The occupancy sensor 62 may be, for example, a weight sensor, image detection, a buckled seatbelt, etc. The vehicle 12 may include any suitable number of occupancy sensors 62. For example, the vehicle 12 may include a number of occupancy sensors 62 equal to the number of seats 30 in the vehicle 12.

The vehicle 12 may include at least one impact sensor 64 for sensing impact of the vehicle 12, and the vehicle computer 58 may be in communication with the impact sensors 64. The impact sensor 64 is configured to detect an impact to the vehicle 12. The impact sensor 64 may be of any suitable type, for example, post-contact sensors such as accelerometers, pressure sensors, and contact switches; and pre-impact sensors such as radar, LIDAR, and vision-sensing systems. The vision-sensing systems may include one or more cameras, CCD image sensors, CMOS image sensors, etc. The impact sensor 64 may be located at numerous points in or on the vehicle 12.

Figure 10:
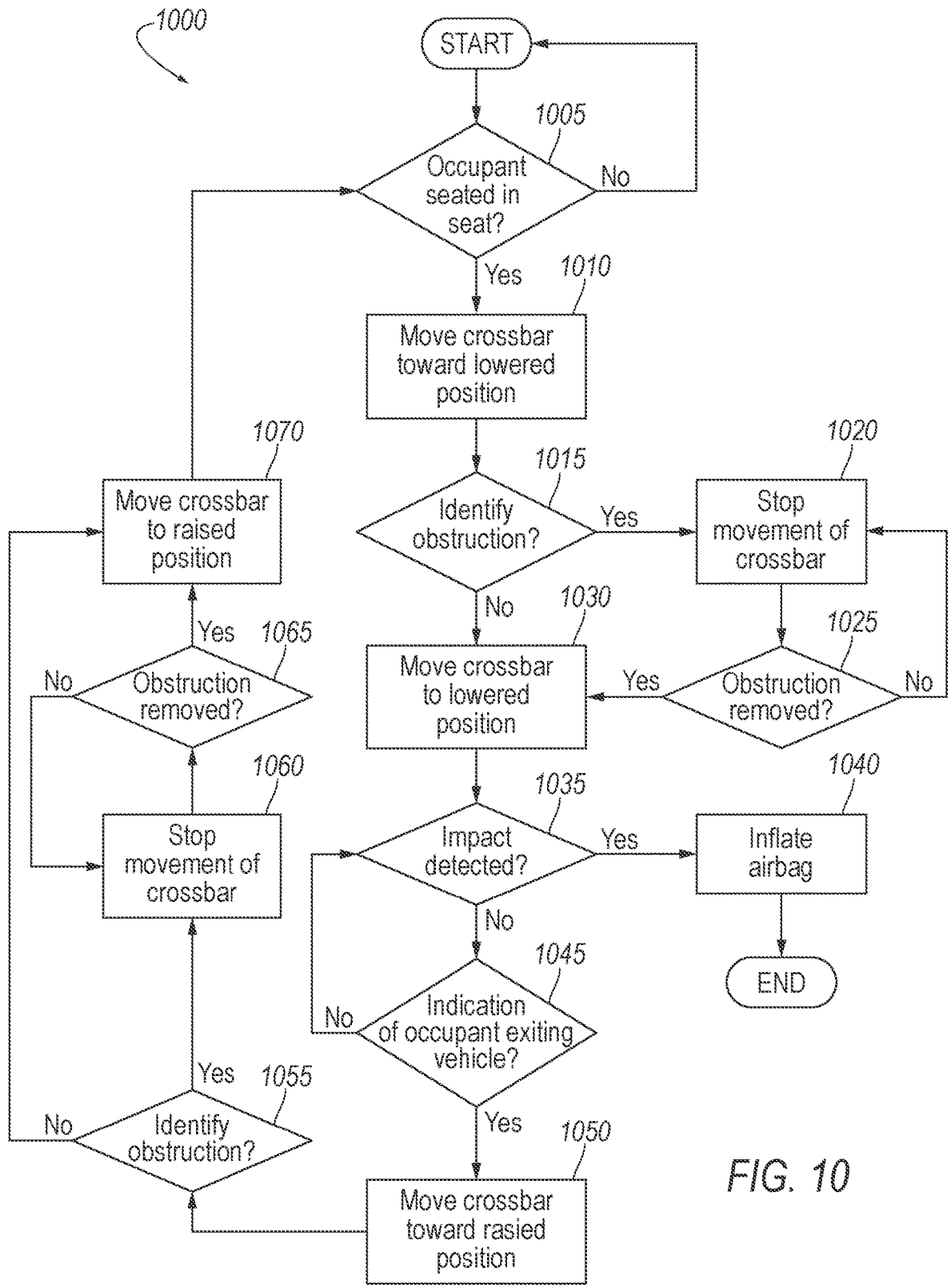
FIG. 10 is a flowchart of a method of moving the crossbar from the raised position to the lowered position.

With reference to FIG. 10, the vehicle computer 58 stores instructions to control components of the vehicle 12 according to the method 1000 shown in FIG. 10. Specifically, as shown in FIG. 10, the computer 58 identifies when to move the crossbar 18 to the lowered position and the raised position based on occupancy of the seats 30. When the crossbar 18 is moving toward the lowered position or toward the raised position, the computer 58 may identify whether the crossbar 18 contacts an obstruction in the passenger compartment. The computer 58 may identify an impact to the vehicle and move the airbag 20 to the inflated position. Use of "based on" and "in response to" herein, including with reference to the instructions stored by the vehicle computer 58 and the method 1000, indicates a causal relationship, not merely a temporal relationship.

With reference to decision block 1005, the method 1000 includes identifying an occupant seated in one of the seats 30 of the vehicle 12. The occupancy sensors 62, e.g., a weight sensor, image detection, buckled seatbelt, etc., may send a signal to the vehicle computer 58 over the vehicle communication network 60. If an occupant is detected in a seat 30 of the vehicle 12, the method 1000 moves to block 1010. If no occupant is detected in the seat 30, the method 1000 returns to its start.

With reference to block 1010, the method 1000 includes moving the crossbar 18 from the raised position toward the lowered position based on identification of the occupant is seated in the seat 30 in decision block 1005. The computer 58 may send a signal to the motor 66 of the linear actuator 44 to move the crossbar 18 toward the lowered position based on an occupant being seated in a seat 30 of the vehicle 12.

With reference to decision block 1015, the method 1000 includes identifying an obstruction between the raised position and the lowered position. After moving the crossbar 18 toward the lowered position, the path that the crossbar 18 follows may become obstructed, e.g., by an occupant entering the vehicle 12, luggage or other items in the passenger compartment, etc. In response to identifying the obstruction, the method 1000 moves to block 1025. If no obstruction is identified, the method 1000 moves to block 1020.

With reference to block 1020, the method 1000 includes stopping movement of the crossbar 18 toward the lowered position based on identification of an obstruction in the vehicle 12. When an obstruction is identified, the crossbar 18 will stop movement until the obstruction is removed.

With reference to decision block 1025, the method 1000 includes identifying the obstruction identified in decision block 1015 has been removed. If the obstruction is identified as being removed, the method 1000 moves to block 1030. If the obstruction is not identified as being removed, the method 1000 returns to block 1020 to continue to stop movement of the crossbar 18.

With reference to block 1030, the method 1000 includes moving the crossbar 18 to the lowered position based on identification that the obstruction has been removed or based on identification of no obstruction in the vehicle 12. Once the obstruction is removed or no obstruction is present in the vehicle 12, the crossbar 18 may move toward the lowered position until the lowered position is reached.

With reference to decision block 1035, the method 1000 includes detecting a vehicle impact. The impact sensors 64 of the vehicle 12 may detect the impact. The impact sensor 64 may send a signal to the vehicle computer 58 to indicate the impact.

With reference to block 1040, the method 1000 includes moving the airbag 20 to the inflated position in response to the detected impact. The vehicle computer 58 may send a signal to the inflator 52 to inflate the airbag 20 to the inflated position. The airbag 20 may control the kinematics of occupants in the seats 30.

With reference to decision block 1045, the method 1000 includes identifying an indication that an occupant is exiting the vehicle 12. The vehicle computer 58 may receive a signal from the occupancy sensors 62 that an occupant is seated in a seat 30 of the vehicle. Such an indication may include sensing occupancy from a weight sensor, the vehicle 12 being put in park, unbuckling of a seatbelt, image detection in the passenger compartment, etc.

With reference to block 1050, the method 1000 includes moving the crossbar 18 from the lowered position toward the raised position based on the indication that the occupant is exiting the vehicle 12. As an occupant is preparing to exit the vehicle 12, the vehicle computer 58 may send a signal to the motor 66 of the linear actuator 44 to move the crossbar 18 toward the raised position to allow occupants to exit the vehicle 12.

With reference to decision block 1055, the method 1000 includes identifying an obstruction between the lowered position and the raised position. The path that the crossbar 18 follows toward the raised position may become obstructed, e.g., by an occupant resting on the crossbar 18 of the vehicle 12, etc. In response to identifying the obstruction, the method 1000 moves to block 1060. If no obstruction is identified, the method 1000 moves to block 1070.

With reference to block 1060, the method 1000 includes stopping movement of the crossbar 18 toward the raised position based on identification of an obstruction in the vehicle 12. When an obstruction is identified, the crossbar 18 will stop movement until the obstruction is removed.

With reference to decision block 1065, the method 1000 includes to identify the obstruction identified in decision block 1060 has been removed. If the obstruction is identified as being removed, the method 1000 moves to block 1070. If the obstruction is not identified as being removed, the method 1000 returns to block 1060 to continue to stop movement of the crossbar 18.

With reference to block 1070, the method 1000 includes moving the crossbar 18 to the raised position based on identification that the obstruction has been removed or based on identification of no obstruction in the vehicle 12. Once the obstruction is removed or no obstruction is present in the vehicle 12, the crossbar 18 may move toward the raised position until the raised position is reached.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
a first pillar and a second pillar spaced cross-vehicle from the first pillar;
a crossbar movably supported by the first pillar and the second pillar, the crossbar being movable along the first pillar and the second pillar from a raised position to a lowered position; and
an airbag supported by the crossbar.

2. The assembly of claim 1, further comprising a first track supported by the first pillar and a second track supported by the second pillar, the crossbar being moveably supported by the first track and the second track.

3. The assembly of claim 2, further comprising a linear actuator supported by one of the first pillar and the second pillar, the crossbar being moveable by the linear actuator along the first track and the second track from the raised position to the lowered position.

4. The assembly of claim 1, wherein the crossbar is spring-loaded between the first pillar and the second pillar.

5. The assembly of claim 1, wherein the crossbar is elongated from the first pillar to the second pillar.

6. The assembly of claim 1, further comprising a vehicle roof supported by the first pillar and the second pillar, the crossbar being spaced from the vehicle roof in the lowered position.

7. The assembly of claim 6, wherein the vehicle roof defines a slot elongated from the first pillar to the second pillar, the crossbar being in the slot in the raised position.

8. The assembly of claim 1, further comprising a pair of seats spaced along a vehicle-longitudinal axis, the crossbar being between the pair of seats.

9. The assembly of claim 8, wherein the airbag includes a cross-vehicle chamber elongated along the crossbar and an extension supported by the cross-vehicle chamber, the extension extending transverse to the cross-vehicle chamber and toward an occupant seating area of one of the seats in an inflated position.

10. The assembly of claim 1, wherein the airbag includes a cross-vehicle chamber elongated along the crossbar and an extension supported by the cross-vehicle chamber extending transverse to the cross-vehicle chamber in an inflated position.

11. The assembly of claim 10, wherein the cross-vehicle chamber and the extension are fluidly connected.

12. The assembly of claim 10, wherein the cross-vehicle chamber surrounds the crossbar in the inflated position.

13. The assembly of claim 10, further comprising a second extension supported by the cross-vehicle chamber extending transverse to the cross-vehicle chamber in the inflated position.

14. The assembly of claim 13, wherein the second extension extends from the cross-vehicle chamber in a direction opposite the extension.

15. The assembly of claim 13, wherein the second extension extends from the cross-vehicle chamber in a common direction of the extension.

16. The assembly of claim 1, further comprising a linear actuator supported by one of the first pillar and the second pillar, the crossbar being moveable by the linear actuator from the raised position to the lowered position.

17. The assembly of claim 1, further comprising an inflator supported on the crossbar and in fluid communication with the airbag.

18. The assembly of claim 1, wherein the airbag is inflatable to an inflated position surrounding the crossbar when the crossbar is in the lowered position.

19. The assembly of claim 1, further comprising a computer including a processor and a memory storing instructions executable by the processor to:
   identify an occupant is seated in a seat of a vehicle;
   move the crossbar from the raised position to the lowered position based on identification of the occupant being seated in the seat;
   identify an indication that an occupant is exiting the vehicle; and
   move the crossbar from the lowered position to the raised position based on the indication that the occupant is exiting the vehicle.

20. The assembly of claim 19, wherein the instructions executable by the processor further include to:
   identify an obstruction between the raised position and the lowered position; and stop movement of the crossbar toward the lowered position based on identification of the crossbar contacting an obstruction in the vehicle.

\* \* \* \* \*